UNITED STATES PATENT OFFICE.

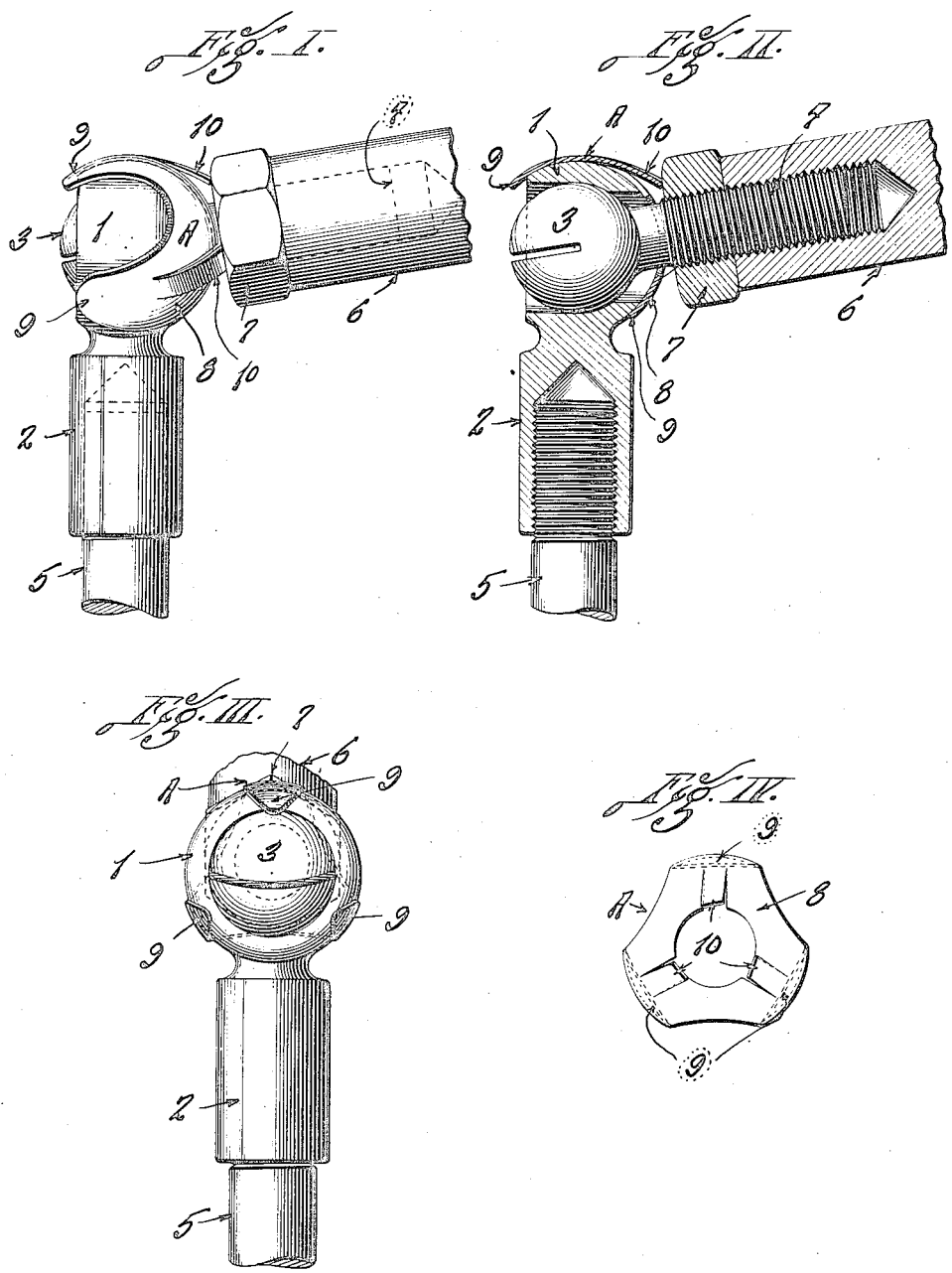

JOSEPH J. HAGEN, OF ST. LOUIS, MISSOURI.

BALL-AND-SOCKET JOINT.

1,265,445.  Specification of Letters Patent.  Patented May 7, 1918.

Application filed May 19, 1917. Serial No. 169,639.

*To all whom it may concern:*

Be it known that I, JOSEPH J. HAGEN, a citizen of the United States of America, a resident of the city of St. Louis, State of Missouri, have invented certain new and useful Improvements in Ball-and-Socket Joints, of which the following is a full, clear, and exact description, reference being had to the accompanying drawing, forming a part of this specification.

My invention relates to a universal connecting device, preferably in the form of a ball and socket joint whereby movement is transmitted from one member to another. One of the objects is to produce a simple and efficient means for locking a screw threaded nut at a point adjacent to the joint. Another object is to retain the elements of the joint in engagement with each other. In the preferred form of the invention, the nut to be locked oscillates with the ball member of the joint, and a yieldable nut locking device is interposed between and fitted to the nut and socket member, so as to move freely with the ball members. The nut lock does not interfere with the universal movement of the joint, and by arranging the parts as herein shown, the nut lock yieldingly forces the ball onto its seat in the socket, thus eliminating lost motion and preventing the joint from rattling.

Figure I is a side elevation of a ball and socket joint embodying the features of my invention.

Fig. II is a similar view, partly in section.

Fig. III is a front elevation of the joint.

Fig. IV is a detail view of the yieldable nut locking device.

To illustrate the invention I have shown a ball and socket joint comprising a socket 1 having a tubular extension 2 provided with internal screw threads. A ball member 3, seated in the socket, has a threaded stem 4 which passes through a relatively large opening in the socket. A rod 5, screwed into the tubular extension 2, is connected by means of the ball and socket joint, to a tubular member 6 screwed onto the stem 4. A nut 7, on the threaded stem 4, is firmly fitted to the end of the tubular member 6 to prevent the latter from turning on the threaded stem. To lock the nut, a yieldable nut locking device A is interposed between and firmly fitted to the nut and socket 1.

This nut locking device preferably comprises a web 8 surrounding the stem 4, fingers 9 extending from said web and fitted to the outer face of the socket, and prongs 10 having points which engage the nut 7. The nut locking device is formed by a single piece of yieldable sheet metal, and the prongs 10 may be readily produced by cutting and bending the sheet metal. The tubular member 2, extending from the socket 1, lies between two of the fingers 9 (Fig. III) and the socket is thus loosely interlocked with the nut locking device to positively prevent the latter from rotating. It will be observed that the fingers 9 are separated from each other to form three recesses, and the tubular member 2 may be located in either of these recesses.

When the joint is in service, the nut locking device oscillates with the ball member 3, at the same time remaining in firm engagement with the nut, and also retaining the ball and socket member in firm engagement with each other.

I claim:—

1. A joint comprising a socket, a ball member seated in said socket, a screw threaded stem extending from said ball member, a nut fitted to said stem, and a yieldable nut locking member interposed between and fitted to said nut and socket so as to lock the nut and at the same time force the ball member onto its seat in the socket, said nut locking member being interlocked with the socket.

2. A joint comprising a socket, a ball member seated in said socket, a screw threaded stem extending from said ball member, a nut fitted to said stem, and a yieldable nut locking member interposed between and fitted to said nut and socket so as to lock the nut and at the same time force the ball member onto its seat in the socket, said nut locking member and the socket being provided with extensions which coöperate with each other to prevent the nut from turning on the axis of said stem.

3. A joint comprising a socket, a ball member seated in said socket, a screw threaded stem extending from said ball member, a nut fitted to said stem, and a yieldable nut locking member surrounding said stem and interposed between said nut and socket member, said yieldable nut locking member having a prong which engages the nut and a plurality of fingers which yieldingly engage the outer face of the socket, and said socket having a stem which lies between said fingers.

4. A ball and socket joint comprising a socket, a ball member seated in said socket, a screw threaded member adjustably secured to said ball member, and a locking device for preventing said screw threaded member from turning about its axis, said locking device being interlocked with said socket.

5. A ball and socket joint comprising a socket, a ball member seated in said socket, a screw threaded member adjustably secured to said ball member, and a locking device for preventing said screw threaded member from turning about its axis, said locking device being firmly fitted to said screw threaded member and loosely interlocked with said socket so as to oscillate with the ball member.

In testimony that I claim the foregoing I hereunto affix my signature.

JOSEPH J. HAGEN.